United States Patent
Gschossmann et al.

(10) Patent No.: US 7,532,447 B2
(45) Date of Patent: May 12, 2009

(54) ELECTRONIC CIRCUIT CONFIGURATION FOR CONNECTING AT LEAST ONE ACTIVE ROTARY SPEED SENSOR, ESPECIALLY IN COMMERCIAL VEHICLES

(75) Inventors: Günther Gschossmann, Ampfing (DE); Alexander Fink, München (DE)

(73) Assignee: KNORR-BREMSE Systems fur Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 10/575,381

(22) PCT Filed: Oct. 8, 2004

(86) PCT No.: PCT/EP2004/011248
§ 371 (c)(1),
(2), (4) Date: May 23, 2007

(87) PCT Pub. No.: WO2005/036184
PCT Pub. Date: Apr. 21, 2005

(65) Prior Publication Data
US 2007/0274013 A1    Nov. 29, 2007

(30) Foreign Application Priority Data
Oct. 10, 2003    (DE) .................... 103 47 118

(51) Int. Cl.
*H02H 3/20*    (2006.01)
*H02H 9/04*    (2006.01)

(52) U.S. Cl. ........................ 361/91.1; 361/91.5
(58) Field of Classification Search ............... None
See application file for complete search history.

(56) References Cited

U.S. PATENT DOCUMENTS

| 5,410,441 A | 4/1995 | Allman |
| 5,913,911 A | 6/1999 | Beck et al. |
| 2004/0016461 A1* | 1/2004 | Qu et al. ............ 137/554 |

FOREIGN PATENT DOCUMENTS

| DE | 34 36 433 | 4/1986 |
| DE | 34 25 235 | 3/1992 |
| DE | 195 24 718 | 2/1997 |
| JP | 9-196943 | 7/1997 |
| JP | 2001-034347 | 2/2001 |
| JP | 52-108551 | 8/2007 |
| WO | 95 17680 | 6/1995 |

OTHER PUBLICATIONS

Morsch, Joachim; Circuit arrangement for protecting electronic circuits againts overvoltages; pp. 1-2; Fig. 1 and 2.*

* cited by examiner

*Primary Examiner*—Stephen W Jackson
*Assistant Examiner*—Dharti H Patel
(74) *Attorney, Agent, or Firm*—Kenyon & Kenyon LLP

(57) ABSTRACT

An electronic circuit configuration for connecting an active rotary speed sensor.

10 Claims, 1 Drawing Sheet

ELECTRONIC CIRCUIT CONFIGURATION FOR CONNECTING AT LEAST ONE ACTIVE ROTARY SPEED SENSOR, ESPECIALLY IN COMMERCIAL VEHICLES

FIELD OF THE INVENTION

The present invention relates to an electronic circuit configuration for connecting at least one active rotary speed sensor of a vehicle via an assigned signal conditioning circuit to a control unit for further signal processing of the rotary speed signal.

BACKGROUND INFORMATION

Rotary speed sensors of the type that is of interest here are used in vehicle technology to obtain one of the most important input variables for the electronic control of a vehicle. Thus, the conventional antilock brake systems (ABS), antislip controls (ARS) and vehicle stability control systems (FSR, ASMS) are forced to rely on permanent measurement and evaluation of the rotary speed response of the individual vehicle wheels. The rotary speed signals of each individual vehicle wheel are recorded and transmitted via a sensor line to an electronic control unit, for the purpose of being evaluated.

Such an active rotary speed sensor is known from International Published PCT Application No. 95 17680. The fixed part of the rotary speed sensor includes a magnetoresistive sensor element having a permanent magnet that is used as booster magnet, and besides that has electronic circuit components for signal conditioning. An active rotary speed sensor requires a current supply. The output signal of the active rotary speed sensor is a binary current signal, which is composed of impressed currents of different amplitudes. The rotary speed information is located in the frequency or in the change between the two current levels. Known rotary speed sensors of this type give rise to a square wave signal, whose frequency reproduces the measured rotary speed.

For the further processing of the information supplied by the active rotary speed sensor, a microcontroller is usually inserted, on whose input side the circuit for the signal conditioning is preconnected. The relatively cost-effective, active rotary speed sensors that are obtainable in the passenger car field are not suitable For the recording of the rotary speed in the field of commercial vehicles. These rotary speed sensors could be damaged if they come into connection with the onboard voltage of 24 Volt of the commercial vehicle, since this type of rotary speed sensor is designed only for maximum voltages of 12 Volt of the passenger vehicle electrical system.

SUMMARY OF THE INVENTION

It is therefore the object of the present invention to improve the electronic configuration of an active rotary speed sensor for the passenger vehicle field, at minimum increased expenditure, in such a way that it is usable in the commercial vehicle field.

The objective is achieved starting from an electronic circuit configuration in conjunction with its distinguishing features.

The present invention includes the technical teaching that a normally closed switching element is inserted into the circuit for the current supply of the active rotary speed sensor, which is able to be switched into the open state via means for detecting a short circuit in sensor line A or B, in order to prevent an overvoltage that is damaging to the active rotary speed sensor.

The design approach according to the present invention thus describes an electronic circuit configuration for the protection of active rotary speed sensor, especially for installation in commercial vehicles having an onboard voltage of at least 24 Volt. Starting from circuits for signal conditioning, that are sufficiently well known in the related art, for active rotary speed sensors, these are to be broadened according to the present invention. All in all, one obtains an electronic circuit configuration which protects in a simple way the cost-effective active rotary speed sensor, that is designed for use in passenger vehicles, from higher currents than the maximum currents permissible for the rotary speed sensor, from the 24 volt vehicle electrical system of the commercial vehicle. The circuit technology expenditure for implementing this measure is slight.

Preferably, the normally closed switching element of the circuit configuration is developed as a transistor, whose base terminal is activated by the means for the detection of a short circuit in sensor line A or B. The switching element according to the present invention may be implemented in a simple manner, in component technology, as a normal bipolar transistor. However, it is also possible to design the switching element as a type of FET transistor or as a relay or in any other suitable manner.

The means, according to the present invention, for detecting a higher voltage potential than the sensor operating voltage in sensor line A or B advantageously include an in parallel connected diode device which controls a transistor, via at least one Z diode as threshold value element, which, in turn, switches the previously mentioned switching element, that is also preferably developed as a transistor, into the open state. This component technology adaptation requires a minimum of electronic components, so that the manufacturing expenditure is correspondingly low. Alternatively to the preferably only Z diode as threshold value element, it is also conceivable to assign its own diode to each sensor line A or B in the signal path after the diode device connected in parallel.

Preferably, the active rotary speed sensor used according to the present invention is designed for a lower operating voltage than the electrical system voltage of the vehicle. For example, rotary speed sensors having an operating voltage of 12 volt are able to be used in a 24 volt vehicle electrical system of a commercial vehicle. Since active rotary speed sensors for 12 volt applications are cost-effectively available as mass-produced items, the electronic circuit configuration according to the present invention may make these rotary speed sensors applicable for commercial vehicles.

The signal conditioning circuit for level adjustment between the active rotary speed sensor and the electronic control unit as evaluation circuit takes place via a fixed current limitation known per se, having a comparator postconnected in the signal path. Adapted to this, the electronic control unit is preferably developed as a microcontroller, to which the conditioned rotary speed signal of the active rotary speed sensor is supplied.

BRIEF DESCRIPTION OF THE DRAWING

The FIGURE shows an electronic circuit configuration for connecting an active rotary speed sensor.

DETAILED DESCRIPTION

Figure 1:
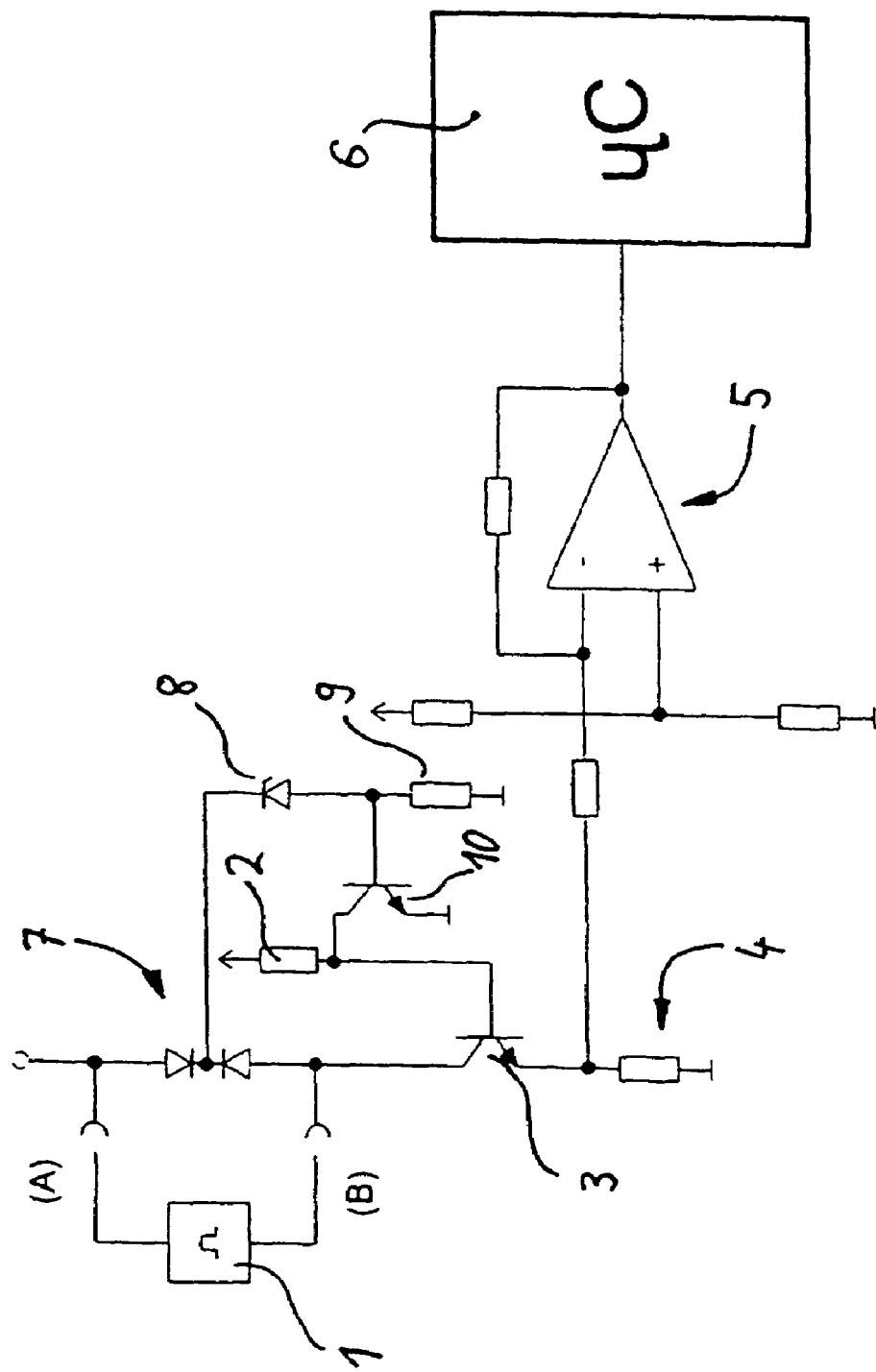

An active rotary speed sensor 1 destined for a passenger vehicle is inserted into a 24 volt vehicle electrical system of a commercial vehicle. Two sensor lines A and B are outgoing from active rotary speed sensor 1. Because of the current via a resistor 2, a switching element 3 developed as a bipolar transistor is conductive, so that active rotary speed sensor 1 is in normal operation. A fixed current limitation connected to ground produces a signal conditioning circuit 4 in this context, which is used for level equalization. Signal conditioning circuit 4 has a comparator 5 postconnected to it, whose output is connected to the input of a microcontroller as control unit 6. Control unit 6 is used for further signal processing of the rotary speed signal generated by active rotary speed sensor 1 within the vehicle which is not shown.

In the fault case, i.e when a higher potential occurs than the operating voltage in sensor lines A or B, a current flow is created through diode device 7 that is correspondingly connected in parallel, which is a component of additional means for detecting said fault case. A postconnected, common Z diode 8, which is used here as a type of threshold value element, becomes conducting counter to its forward direction when the voltage drop via the Z diode attains a specified boundary value. The specified boundary value corresponding to the component parameters corresponds to the occurrence of a fault case, that is, the situation in which a damaging overvoltage is created. Upon the exceeding of the boundary value, a current flows towards ground via a resistor 9. As a result, a transistor 10 is switched through which, in turn, switches normally closed switching element 3, that is also developed as a transistor, into the open state. Consequently, a damaging overvoltage is forestalled by active rotary speed sensor 1.

The present invention is not limited to the exemplary embodiment described above. Rather, modifications thereof are also conceivable. Thus it is possible, for example, instead of only one transistor 10, to use a plurality of driver stages for controlling the transistor used as switching element 3, or to use a similarly functioning component, when necessary. Instead of a Z diode that is common to both sensor lines A and B, a dedicated z diode for each sensor line may also be provided.

LIST OF REFERENCE NUMERALS

1 active rotary speed sensor
2 resistor
3 switching element
4 signal conditioning circuit
5 comparator
6 control unit
7 diode device
8 Z diode
9 resistor
10 transistor

What is claimed is:

1. An electronic circuit configuration for connecting at least one active rotary speed sensor of a vehicle via an assigned signal conditioning circuit to a control unit for further signal processing of a rotary speed signal, comprising:
a normally closed switching element inserted into a circuit for a current supply of the active rotary speed sensor, the switching element being switchable into an open state via a detecting arrangement to detect an overvoltage in one of a first sensor line and a second sensor line to prevent an overvoltage that is damaging to the active rotary speed sensor;
wherein the active rotary speed sensor is designed for a lower operating voltage than an electrical system voltage of the vehicle.

2. The electronic circuit configuration as recited in claim 1, wherein the normally closed switching element includes a transistor, and a base terminal of the transistor is controlled by the detecting arrangement.

3. The electronic circuit configuration as recited in claim 2, wherein the detecting arrangement includes a diode device that is correspondingly connected in parallel, and the diode device controls a second transistor via at least one Z diode serving as a threshold value element which, in turn, switches the switching element into the open state.

4. The electronic circuit configuration as recited in claim 1, wherein the signal conditioning circuit includes a comparator.

5. The electronic circuit configuration as recited in claim 1, wherein the control unit includes a microcontroller for an input-side supply of the rotary speed signal.

6. A motor vehicle, comprising:
an electronic circuit configuration for connecting at least one active rotary speed sensor of a vehicle via an assigned signal conditioning circuit to a control unit for further signal processing of a rotary speed signal, the electronic circuit configuration including:
a normally closed switching element inserted into the circuit for a current supply of the active rotary speed sensor, the switching element being switchable into an open state via a detecting arrangement to detect an overvoltage in one of a first sensor line and a second sensor line to prevent an overvoltage that is damaging to the active rotary speed sensor;
wherein the active rotary speed sensor is designed for a lower operating voltage than an electrical system voltage of the vehicle.

7. The motor vehicle as recited in claim 6, wherein the normally closed switching element includes a transistor, and a base terminal of the transistor is controlled by the detecting arrangement.

8. The motor vehicle as recited in claim 7, wherein the detecting arrangement includes a diode device that is correspondingly connected in parallel, and the diode device controls a second transistor via at least one Z diode serving as a threshold value element which, in turn, switches the switching element into the open state.

9. The motor vehicle as recited in claim 6, wherein the signal conditioning circuit includes a comparator.

10. The motor vehicle as recited in claim 6, wherein the control unit includes a microcontroller for an input-side supply of the rotary speed signal.

* * * * *